US012715552B2

(12) United States Patent
Trewern

(10) Patent No.: US 12,715,552 B2
(45) Date of Patent: Aug. 25, 2026

(54) APPARATUS AND METHOD FOR WIRELESS COMMUNICATION IN POWERED WATERCRAFT

(71) Applicant: FLITEBOARD PTY LTD, Byron Bay (AU)

(72) Inventor: David Trewern, Byron Bay (AU)

(73) Assignee: FLITEBOARD PTY LTD, Byron Bay (AU)

( * ) Notice: Subject to any disclaimer, the term of this patent is extended or adjusted under 35 U.S.C. 154(b) by 377 days.

(21) Appl. No.: 18/546,900

(22) PCT Filed: Feb. 17, 2022

(86) PCT No.: PCT/AU2022/050114
§ 371 (c)(1),
(2) Date: Aug. 17, 2023

(87) PCT Pub. No.: WO2022/174296
PCT Pub. Date: Aug. 25, 2022

(65) Prior Publication Data

US 2024/0140562 A1 May 2, 2024

(30) Foreign Application Priority Data

Feb. 19, 2021 (AU) ................................ 2021900437
Feb. 19, 2021 (AU) ................................ 2021900438

(51) Int. Cl.
*B63B 32/10* (2020.01)
*B63B 32/60* (2020.01)
(Continued)

(52) U.S. Cl.
CPC .............. *B63B 32/10* (2020.02); *B63B 32/60* (2020.02); *H01M 50/22* (2021.01); *H02J 7/82* (2026.01); *H02J 7/84* (2026.01); *H01M 2220/20* (2013.01)

(58) Field of Classification Search
CPC ...................................................... B63B 32/10
See application file for complete search history.

(56) References Cited

U.S. PATENT DOCUMENTS 8,692,663 B2 † 4/2014 Fecher
8,951,079 B2 † 2/2015 Railey
(Continued)

FOREIGN PATENT DOCUMENTS

WO 2019/104378 A1 6/2019
WO 2019/104379 A1 6/2019
WO 2019/183668 A1 10/2019

OTHER PUBLICATIONS

International Search Report for PCT/AU2022/050114 mailed Apr. 11, 2022, 4 pages.
(Continued)

*Primary Examiner* — Brian O Peters
(74) *Attorney, Agent, or Firm* — NIXON & VANDERHYE

(57) ABSTRACT

A hydrofoil watercraft includes a board, a hydrofoil, and a motor that are connected to the board by a mast, a battery module locatable in the board, the battery module including a battery and a first wireless communication device that are both located in a battery housing and a controller module locatable in the board. The controller module includes a controller and a second wireless communication device that are both located in a controller housing wherein the battery module is configured to transmit battery status data using the first wireless communication device and the second wireless communication device is configured to receive the battery status data and relay the data to the controller.

19 Claims, 6 Drawing Sheets

(51) Int. Cl.

| | |
|---|---|
| ***H01M 50/22*** | (2021.01) |
| ***H02J 7/82*** | (2026.01) |
| ***H02J 7/84*** | (2026.01) |

(56) References Cited

U.S. PATENT DOCUMENTS

| | | | | |
|---|---|---|---|---|
| 9,293,935 | B2 † | 3/2016 | Lee | |
| 10,235,870 | B2 † | 3/2019 | Leason | |
| 10,597,118 | B2 † | 3/2020 | Montague | |
| 2015/0104985 | A1 * | 4/2015 | Langelaan | B63H 1/16 441/74 |
| 2018/0072383 | A1 | 3/2018 | Montague et al. | |
| 2018/0170499 | A1 * | 6/2018 | Terada | B63C 11/46 |

OTHER PUBLICATIONS

Written Opinion of the ISA for PCT/AU2022/050114 mailed Apr. 11, 2022, 3 pages.

* cited by examiner
† cited by third party

APPARATUS AND METHOD FOR WIRELESS COMMUNICATION IN POWERED WATERCRAFT

CROSS-REFERENCE TO RELATED APPLICATIONS

This application is the U.S. national phase of International Application No. PCT/AU2022/050114 filed Feb. 17, 2022 which designated the U.S. and claims priority to AU Provisional Patent Application Nos. 20/219,00437 filed Feb. 19, 2021, and 2021900438 filed Feb. 19, 2021, the entire contents of each of which are hereby incorporated by reference.

BACKGROUND OF THE INVENTION

The present invention generally relates to hydrofoil watercraft, and in particular to a craft or board with a hydrofoil and an electric motor and battery.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

Recent developments in battery technology have started to make electric watercraft more practical, where high power requirements and the size and weight of batteries previously prevented this. These watercraft tend to be relatively small, such as for use as a backup on a small sail boat or as the primary propulsion source on a rigid inflatable boat, tender, or similar. The propulsion systems are generally in the form of an outboard motor connected to a battery located within the board.

One particular form of watercraft that is growing in popularity is the electric hydrofoil surfboard, created by the attachment of a hydrofoil and a motor to a surfboard, with the battery typically housed within the board. These systems include an electric motor and a hydrofoil in combination, where the hydrofoil elevates the board clear of the water when under power from the motor, reducing drag and providing high speed travel over the water.

The hydrofoil and motor are positioned towards a lower end of a mast, while an upper end of the mast is bolted to an underside of the board. One method of developing such a system has been to take an existing hydrofoil surfboard and insert a motor to part of the mast.

Many components required for operation of the motor may be housed in the board, such as batteries and/or control circuitry. These components must then be connected to the motor at the lower end of the mast by wires that are routed internally down the mast.

Control of the motor may be achieved via a hand controller communicating wirelessly with the control circuitry located in the board. This may be relatively straightforward from a technical perspective for situations where the board is elevated above the water. However, due to the attenuation of wireless signals by water, communication problems may arise in situations where the board becomes partially submerged. This may be quite common when first starting the board, or when a beginner user is not yet capable of gaining sufficient speed for the board to hydrofoil.

The combination of water and electricity, together with large changes in temperature and heat generated by electrical components, means that adequate sealing is difficult but very important in both conventional and hydrofoil watercraft. Adding to this complexity, it is often desirable for the watercraft to be easily disassembled regularly for transport or for maintenance, but to still have adequate sealing every time it is assembled again for use.

SUMMARY OF THE PRESENT INVENTION

In one broad form of the invention, there is provided a hydrofoil watercraft, comprising: a board; a hydrofoil and a motor that are connected to the board by a mast; a battery module locatable in the board, the battery module comprising a battery and a first wireless communication device that are both located in a battery housing; and a controller module locatable in the board, the controller module comprising a controller and a second wireless communication device that are both located in a controller housing; wherein the battery module is configured to transmit battery status data using the first wireless communication device and the second wireless communication device is configured to receive the battery status data and relay the data to the controller.

In an embodiment, data can also be sent from the second wireless communication device to the first wireless communication device.

In an embodiment, the hydrofoil watercraft further comprises an input device comprising a third wireless communication device that is configured to exchange data with the first wireless communication device and/or the second wireless communication device, wherein the board comprises an outer shell that has a transmission section that is highly permeable to wireless signals as used by the third wireless communication device.

In an embodiment, the input device is a hand controller.

In an embodiment, the third wireless communication device exchanges data with the second wireless communication device.

In an embodiment, the outer shell of the board comprises carbon fibre in locations other than the transmission section.

In an embodiment, the transmission section is at least one of: located proximal to a front end of the board; located proximal to a rear end of the board; and located on a portion of a deck of the board.

In an embodiment, the board comprises a second transmission section, wherein the two transmission sections are located at substantially opposite locations of the board.

In an embodiment, the transmission section is highly permeable to electromagnetic radiation in the frequency range of 2.4 to 2.5 GHz and/or electromagnetic radiation in the frequency range of 5 to 6 GHz.

In an embodiment, a dimension of the transmission section is chosen from the group comprising: 5-6 cm; 4-7 cm; 6-10 cm; <5 cm; and >10 cm.

In an embodiment, data is transferred using a Bluetooth protocol.

In an embodiment, the wireless communication devices are paired as required prior to exchanging data.

In an embodiment, the controller module and the battery module are removable from the board.

In an embodiment, the controller module is in a waterproof compartment.

In an embodiment, an air gap is positioned between the battery module and the controller module.

In an embodiment, the controller housing and the battery housing are each constructed at least partially from a material with low electrical conductivity.

In an embodiment, the battery module and the controller module are linked by an electrical connection for the transmission of power only, with all data communication being performed wirelessly.

In an embodiment, the controller module is fixed to an upper end of the mast and can be coupled to the board by inserting at least a portion of the controller module into a socket of the board.

In an embodiment, there is no electrical connection between the battery module and the board or between the controller module and the board, such that the board does not contain any electrical component.

In an embodiment, a core of the board comprises at least one of: foam; and a hollow section.

It will be appreciated that the broad forms of the invention and their respective features can be used in conjunction and/or independently, and reference to separate broad forms is not intended to be limiting. Furthermore, it will be appreciated that features of the method can be performed using the system or apparatus and that features of the system or apparatus can be implemented using the method.

BRIEF DESCRIPTION OF THE DRAWINGS

Various examples and embodiments of the present invention will now be described with reference to the accompanying drawings, in which: —

DETAILED DESCRIPTION OF THE PREFERRED EMBODIMENTS

Figure 1:
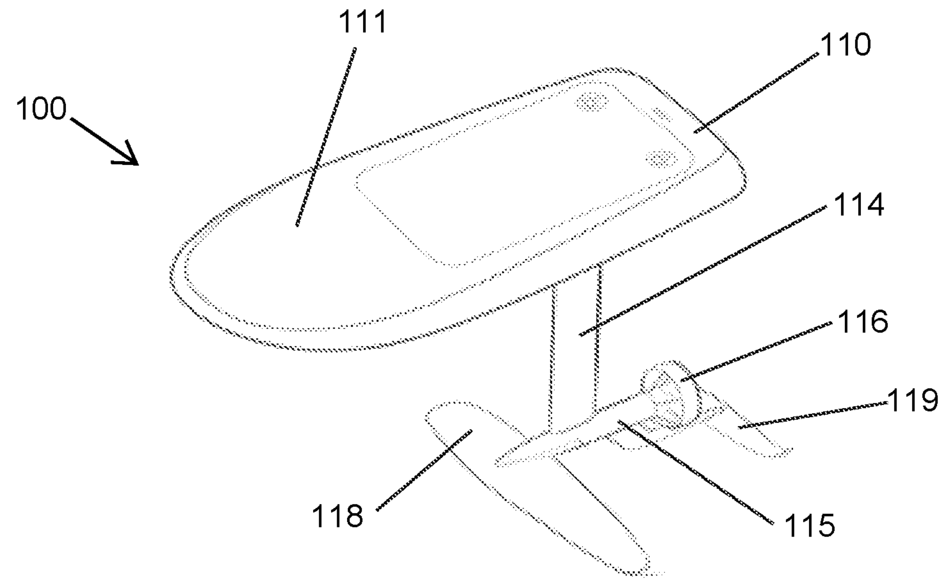
FIG. 1 is an isometric view of a watercraft according to an embodiment of the invention.

The following modes, given by way of example only, are described in order to provide a more precise understanding of the subject matter of a preferred embodiment or embodiments.

In the Figures, incorporated to illustrate features of an example embodiment, like reference numerals are used to identify like parts throughout the Figures.

An example of a hydrofoil watercraft according to an embodiment of the invention will now be described. The watercraft is electric powered and includes a board, a hydrofoil and a motor that are connected to the board by a mast, a battery module locatable in the board, and a controller module also locatable in the board. The battery module may include a housing and any necessary components for storing and supplying power, such as a battery. The controller module may include a housing and any necessary components for operating the motor, such as a controller.

The battery module can also include a first wireless communication device located in the battery housing, while the controller can include a second wireless communication device located in the controller housing. This allows the battery module to transmit battery status data using the first wireless communication device and the second wireless communication device can receive the battery status data and relay the data to the controller.

Throughout this specification, unless otherwise indicated the term "board" is used in a broad sense and is intended to include any suitable form of flotation device. For example, the board may be a rigid structure made from fibreglass, carbon fibre, or other similar materials. It may or may not include a foam or other type of core, similar to a surfboard for example. Alternatively, the board may be softer, such as made primarily from a rigid foam or similar. In still another example, the board may be inflatable or collapsible in some other way, so that it can take a rigid or at least semi-rigid form during use, but can be deflated or otherwise packed down for transport.

The watercraft as described is advantageous by permitting use of fewer, simpler, and/or lighter components, potentially reducing cost and/or minimising weight for better performance. For example, rather than having a board that must include data cabling and various attachment points for the battery module and controller module, the board can be made simpler, lighter and/or cheaper, as these components are no longer required.

The reduction in data cabling and connections may also help to ensure that all necessary parts remain watertight to reduce the chance of any malfunction and/or injury. That is, the wireless communication devices being contained within housings could allow for modules to be removed and the watercraft to be packed down for transport, but for each module to be self-contained and data connections reduced or removed. This can limit the necessary seals that could potentially wear over time or cause problems if not fitted exactly correctly on a particular occasion.

Some other example embodiments of a watercraft will now be described.

In different versions of the watercraft, the data may be sent only from the battery module to the controller module. That is, the first communication device would be configured to simply broadcast the data, with the second communication device listening for and receiving the data and performing any further processing necessary, such as error detection, etc. If the data is not received correctly or at all, the controller can then determine how to proceed.

However, preferably data can also be sent in the reverse direction, i.e. two way communication. The wireless communication devices will typically be devices that are capable of communicating utilising a short range wireless communication protocol such as Bluetooth, Bluetooth Low Energy (BLE), or the like.

The battery module and the controller module may be paired prior to exchanging battery status data. In the event that one of the modules are removed and replaced, a pairing procedure may automatically be performed again prior to exchanging data.

In other examples, it will be appreciated that one of a range of other wireless communication protocols may alternatively be used. These may include, but are not limited to, WiFi, LoRa, ZigBee, or any other radio frequency communication as generally known in the art across the range 433 MHz to 5 GHz.

The battery status data transmitted from the battery module can be any desirable information, such as battery identification information, charge level, temperature information, and/or fault indicators, for example. The controller might use the received battery status data from the battery to trigger an event, such as limiting or conserving power when charge level is low or overheating is detected, mitigating action like shutting down the motor if there is a fault in the battery module, and/or notifying the user through an output device of any of the above or other relevant information, etc. This can be done according to certain rules pre-programmed in the controller.

In one example embodiment, an input device with a third wireless communication device may be provided. The third wireless communication device can be configured to exchange data with the first wireless communication device and/or the second wireless communication device.

The board can be provided with an outer shell that has a transmission section. This transmission section can be made from a material, possibly different to the material used in the rest of the board, which is highly permeable to wireless signals as used by the third wireless communication device.

Providing the transmission section is advantageous as it allows for communication to occur even in the event that the board is partially submerged. For example, the first and/or second wireless communication device may be located in the centre or towards the rear of the board. If a user is lying on the board while stationary, particularly if they are lying towards the rear of the board, then it is possible or even likely that the part of the board containing the first and/or second wireless communication device could be submerged. However, if the transmission section is located on part of the board that is not submerged, then the wireless signal may travel through the board and exit above the surface of the water, thereby allowing the wireless signal to reach the third wireless communication device successfully.

The transmission section is also advantageous because it allows the first and/or second wireless communication device to be located in any part of the board as may be desirable, without the need for a receiver, antenna, or similar component to be located in a particular location. This may reduce wiring within the board for example. Accordingly, the resulting watercraft may permit the use of fewer, simpler, and/or lighter components, potentially reducing cost and/or minimising weight for better performance.

The reduction in connections and/or cabling within the board may also help to ensure that all necessary parts remain watertight to reduce the chance of any malfunction and/or injury. For example, the first wireless communication device being located with the battery can allow for these to be contained as a single module that is self-contained and data connections reduced or removed. Similarly, the same advantages can be achieved with the second wireless communication device being located with the controller and contained as a single module. This can limit the necessary seals that could potentially wear over time or cause problems if not fitted exactly correctly on a particular occasion.

In one example, the third wireless communication device may also be capable of communicating utilising a short range wireless communication protocol such as Bluetooth, Bluetooth Low Energy (BLE), or the like. The input device and the controller module and/or the battery module may perform a pairing procedure prior to exchanging data, but in other examples this may not be required.

In other examples, it will be appreciated that one of a range of other wireless communication protocols may alternatively be used, similar to that discussed previously. These may include, but are not limited to, WiFi, LoRa, ZigBee, or any other radio frequency communication as generally known in the art across the range 433 MHz to 5 GHz.

In one embodiment, the input device may be in the form of a hand controller, such as that described in the present Applicant's earlier publication WO2019/183668. It will be appreciated that the input device may also take various other forms, however.

In one preferred example, the input device exchanges data only with the second wireless communication device located in the controller module, with the controller module separately communicating with the battery module as required.

In some examples of the watercraft, the outer shell of the board may be constructed primarily from carbon fibre in locations other than the transmission section. While carbon fibre could otherwise interfere with wireless communication, the transmission section ensures that the input device can still communicate effectively with the controller module and/or battery module.

In this or other examples, the board may have a foam core, a hollow core, or some combination of these and/or other materials in the core. Of course, the reference to the "core" of the board in this sense does not include the controller module, battery module, or other components that may be located within the board.

In various example embodiments of the watercraft, the transmission section could be located proximal to a front end of the board, proximal to a rear end of the board, on a portion of a deck of the board, or in any other location as may be deemed suitable.

The board may also have a second transmission section, or any number of transmission sections. Two transmission sections could also preferably be located at substantially opposite locations of the board, such as the front and rear, left and right edges, or deck and bottom surface. In this way, it is more likely that at least one of the multiple transmission sections will remain above water at all times, ensuring uninterrupted communication between the input device and the controller module and/or battery module.

In some examples, the transmission section is preferably highly permeable to electromagnetic radiation in the frequency range of 2.4 to 2.5 GHz, as used for Bluetooth or the like. Alternatively or additionally, the transmission section may be highly permeable to electromagnetic radiation in the frequency range of 5 to 6 GHz, or any other suitable range as may be desirable for a particular form of wireless communication.

A dimension of the transmission section in different examples may be chosen to ensure it is large enough for reliable wireless communication between the input device and the controller module and/or battery module, without causing any structural or other problems with the board. This dimension, for example, could be approximately 5-6 cm, 4-7 cm, 6-10 cm, <5 cm, >10 cm, or any other size that may be desirable for a particular watercraft design.

In some examples of the watercraft, the controller module may be removable from the board. In these or other examples, the battery module may also be removable from the board. The ability to remove these components may be advantageous for disassembly of the watercraft for transport, for example. By having various components contained within the housings, the modular form can make this disassembly simpler and also reduce the risk of damage or failure of waterproofing seals, for example. The ability to remove one or both of the modules may also be advantageous for the purpose of servicing the watercraft or in the event that there is a malfunction and certain components need to be replaced.

In another example of the watercraft, the controller module may be in a waterproof compartment during use. That is, appropriate seals are provided, for example, to ensure that during use of the watercraft it is not possible for water to reach the controller module. In one specific example, there may be an air gap located adjacent the controller and/or between the battery module and the controller module, which can aid in ensuring there is minimal disruption to communication between the wireless communication devices. For example, the controller could be located inside a controller housing, and an air gap may be located immediately outside or inside the housing. Regardless of whether there is an air gap or not, the prevention of water finding its way between the two modules or around the controller module is advantageous, because this avoids the risk of interference of the wireless signal that water could potentially cause.

The controller housing may be constructed from a range of suitable materials, but it is preferable that the housing is at least partially made from a material with low electrical conductivity. For example, the controller housing may be made from plastic or fiberglass. Similarly, the battery housing is preferably constructed at least partially from a material with low electrical conductivity.

For each of the controller housing and the battery housing, when choosing the construction materials the relevant consideration is to ensure that the housings do not interfere with the wireless communication. Therefore, ensuring that neither of the housings form a faraday cage is important, as is ensuring that any electrically conductive materials are not located between the wireless communication devices. In many situations it may otherwise be desirable to use carbon fibre for the housings, for example, but care must be taken to ensure this is not located in a position or form that could disrupt the wireless communication.

The battery module and the controller module in some examples of the watercraft may be linked by an electrical connection for the transmission of power only. However, all data communication could still be performed wirelessly. This electrical connection may be in the form of a single cable or multiple cables, but in either case the reduction in physical connections allowed by the wireless data transmission can still be advantageous.

In one specific example, the watercraft may be in the form of an electric hydrofoil board. That is, the watercraft may further include a hydrofoil connected to the board by a mast. The motor may also be connected to the mast proximal to the hydrofoil, or the hydrofoil and motor may be connected to one another so that the hydrofoil is actually connected to the mast by the motor.

The hydrofoil and connected components could actually take a range of forms, provided it includes one or more components for providing lift, as well as necessary components for providing propulsion. For example, the hydrofoil module may have an integrated motor and wings similar to the present Applicant's earlier design as described in publication number WO2019/104378. In this way, the wings are not connected directly to the mast, but rather the wings are connected to the motor housing, which in turn is connected to the mast. Alternatively, the hydrofoil module may take a different form, such as some other known designs where a mast has wings mounted at one location and a motor mounted at a separate location.

The controller module may in fact be fixed to an upper end of the mast, so that removal of the controller module in turn also causes the mast, motor and hydrofoil to be removed from the board. For example, the controller module may be coupled to the board by inserting at least a portion of the controller module located at the upper end of the mast into a socket of the board, similar to that described in the present Applicant's earlier design published as WO2019/104379. This could allow very quick and simple assembly and disassembly, while having sufficient strength to withstand the high forces experienced by this connection during use. This connection can also allow for seals to be incorporated relatively easily, to ensure electrical connections are not exposed to water.

In another example of a watercraft, the controller module is further configured to exchange information wirelessly with a hand controller. This may be achieved using the same communication device as is used to communicate with the battery module, or alternatively an additional device may be provided for communication with the hand controller.

The hand controller can function as a user input device for the watercraft, such as by receiving an input through a button or trigger and sending a signal to the controller to choose the level of thrust to be produced by the motor, for example. The hand controller may also be sent information from the controller for display to a user, such as a charge level of the battery, temperature, speed, and any other relevant parameters.

In some examples of the watercraft, there may be no electrical connection between the battery module and the board, and/or there may be no electrical connection between the controller module and the board. That is, rather than the battery module being connected to wiring in the board, with this wiring in turn also being connected to the controller module, instead the battery module and controller module may be directly connected to each other. Additionally, one or both of the battery module and/or controller module may not have any other electrical connections, including no data connections for displays or separate wiring for charging the battery, for example.

In one particular example of a watercraft, all of the electrical components may be located in the controller module and associated components, the battery module, and/or the hand controller. That is, the board itself may not contain any electrical components once the battery module and the controller module are removed. Such a system allows the board to be as cheap, simple, and lightweight as possible.

An example embodiment of a watercraft 100 will now be described with reference to the Figures.

Referring to FIG. 1, the watercraft 100 has a board 110 with a deck 111 that is suitable for a user to lie or stand on when in use. A mast 114 extends from a lower surface of the board 110 and a motor 115 with propeller 116 is connected to a lower end of the mast 114. A main hydrofoil wing 118 and a tail wing 119 are each connected to a body of the motor 115.

Figure 2:
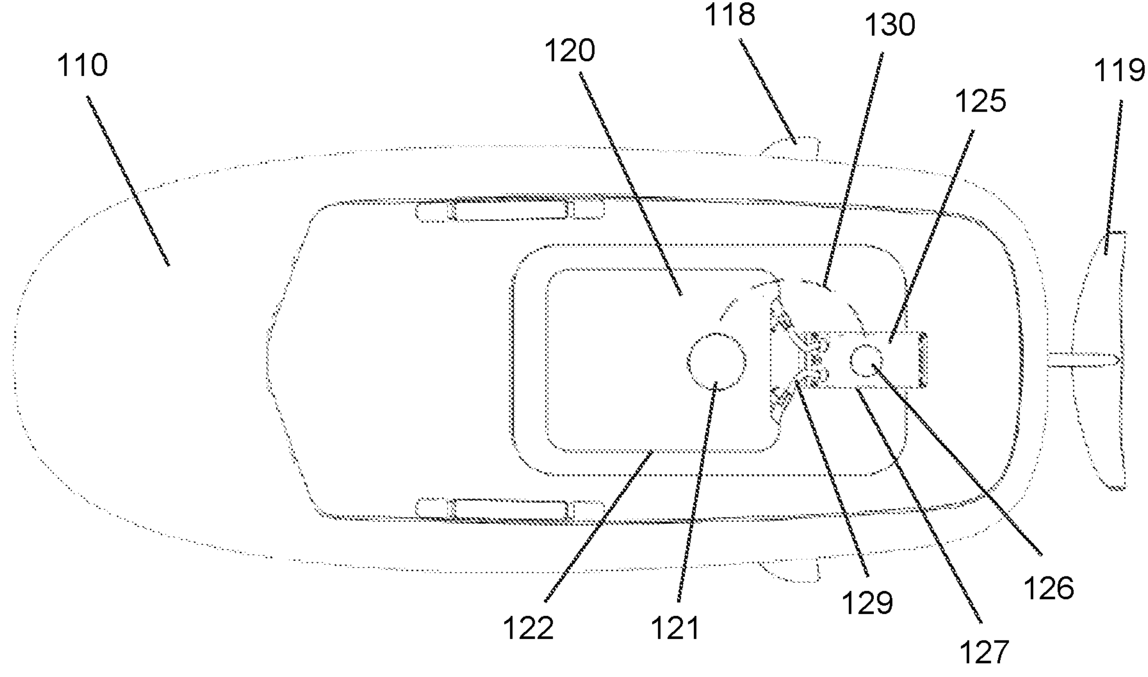
FIG. 2 is a cross sectional plan view of the watercraft from FIG. 1.

Referring now to FIG. 2, the watercraft 100 has a battery module 120 that has a battery and a first wireless communication device 121 located in a battery housing 122. A controller module 125 has a controller and a second wireless communication device 126 located in a controller housing 127. The battery module 120 and the controller module 125 are connected to one another by a positive and a negative power cable 129.

The battery module 120 is configured to transmit battery status data using the first wireless communication device 121, and the second wireless communication device 126 is configured to receive the battery status data and relay the data to the controller.

This exchange of wireless information is illustrated schematically by the broken line 130, but in practice is achieved using a short range wireless communication protocol such as Bluetooth, Bluetooth Low Energy (BLE), or the like. As such, the battery module 120 and the controller module 125 are linked by an electrical connection for the transmission of power only, with all data communication being performed wirelessly.

The wireless communication device 126 of the controller module is also configured to communicate with a hand controller (not shown). The hand controller is operated by the user and is an input device used to control the motor speed and to relay data to the user, such as diagnostic and performance information. This communication also occurs using the same short range wireless communication protocol as the communication with the battery module 120.

By providing a direct electrical connection between the battery module 120 and the controller module 125, the use of wireless data transmission means that the board 110 does not require any electrical components at all. In this way, the manufacture of the board can be greatly simplified and the cost of the board significantly reduced. The reduced complexity can also lower the risk of malfunction, such as may be caused by a water seal failing, for example.

Figure 3:
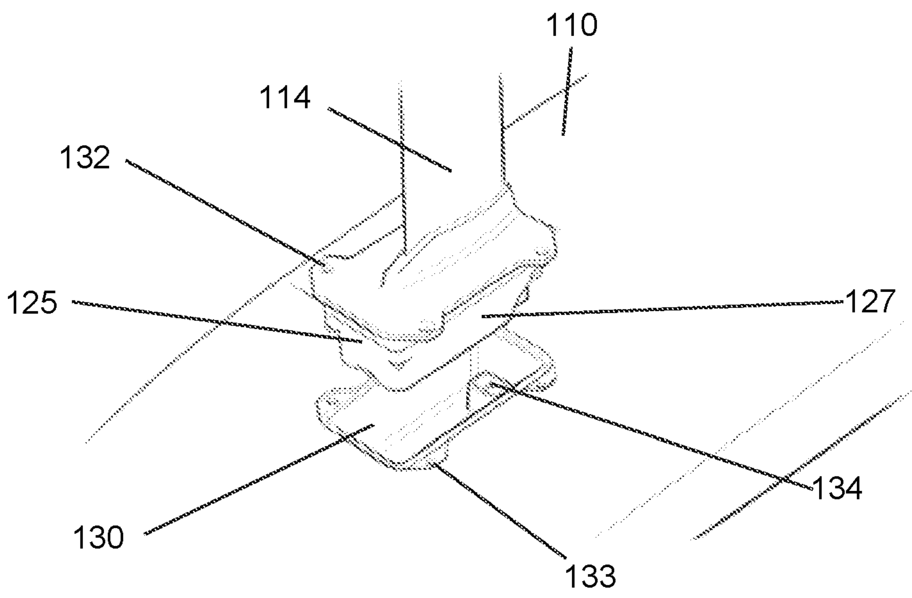
FIG. 3 is an isometric view of an underside of a watercraft with a controller module removed from the board.

Referring to FIG. 3, the controller module 125 is shown removed from the board 110. In this embodiment, the controller module 125 is fixed to the upper end of the mast 114 and can be inserted into a socket 130 of the board 110. Wiring extends along the inside of the mast 114 to connect the controller inside the housing 127 to the motor 115 that is located at the opposite end of the mast 114.

A flange 132 is configured to mate with a rebate 133 in the board 110 and secured in place using fasteners (not shown). The flange 132 forms a watertight seal with the rebate 133 to ensure that no water can enter a space between the housing 127 and the socket 130, maintaining a small air gap between the two. The mast 114 and the flange 132 are constructed from aluminium, while the remainder of the housing 127 is constructed from a plastic.

Once the controller module 125 is inserted into the socket 130, an electrical connection provides power from the battery module 120. In the embodiment of FIG. 3, this electrical connection includes two pins on the controller module 125 which are received in respective apertures 134 in the socket 130. These two conduction paths allow power to be transmitted. However, alternative embodiments such as that shown in FIG. 2, use leads or cables for this electrical connection. Leads or cables may in fact be preferable in some cases, as this can allow the battery to be directly connected to the controller 125, without the need for any wiring or other electronics in the board 110.

Figure 4:
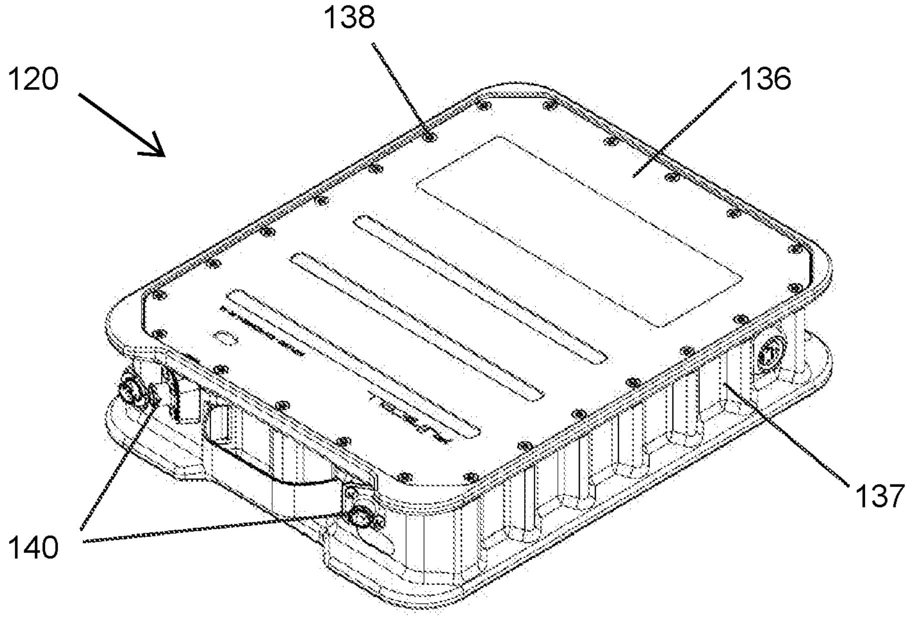
FIG. 4 is an isometric view of a battery module according to an embodiment of the invention.

Referring to FIG. 4, the battery module 120 is shown removed from the board 110. The housing 122 includes flat faces 136 fixed to a protective surround 137 by fasteners 138. The flat faces 136 are made from aluminium with the protective surround 137 being made from a plastic. Electrical connectors 140 are used to provide power from the battery module 120 to the controller module 125.

The controller located in the controller module 125 includes the relevant components for allowing the watercraft 100 to function, including a microprocessor, a memory, an input/output device in the form of one or more wireless communication devices to exchange instructions with the hand controller and battery module, and a logic level motor controller, interconnected by a bus. These components function together to allow the controller to perform tasks including battery management, motor operation, and data output to be displayed to a user.

The nature of the controller and in particular the physical form factor of the device, as well as the components used, can vary depending on the preferred implementation. For example, the microprocessor and communication device can be formed from a custom integrated circuit, such as a Bluetooth system on a chip (SOC), coupled to, or including an integrated antenna and other optional components, such as the memory.

Figure 6:
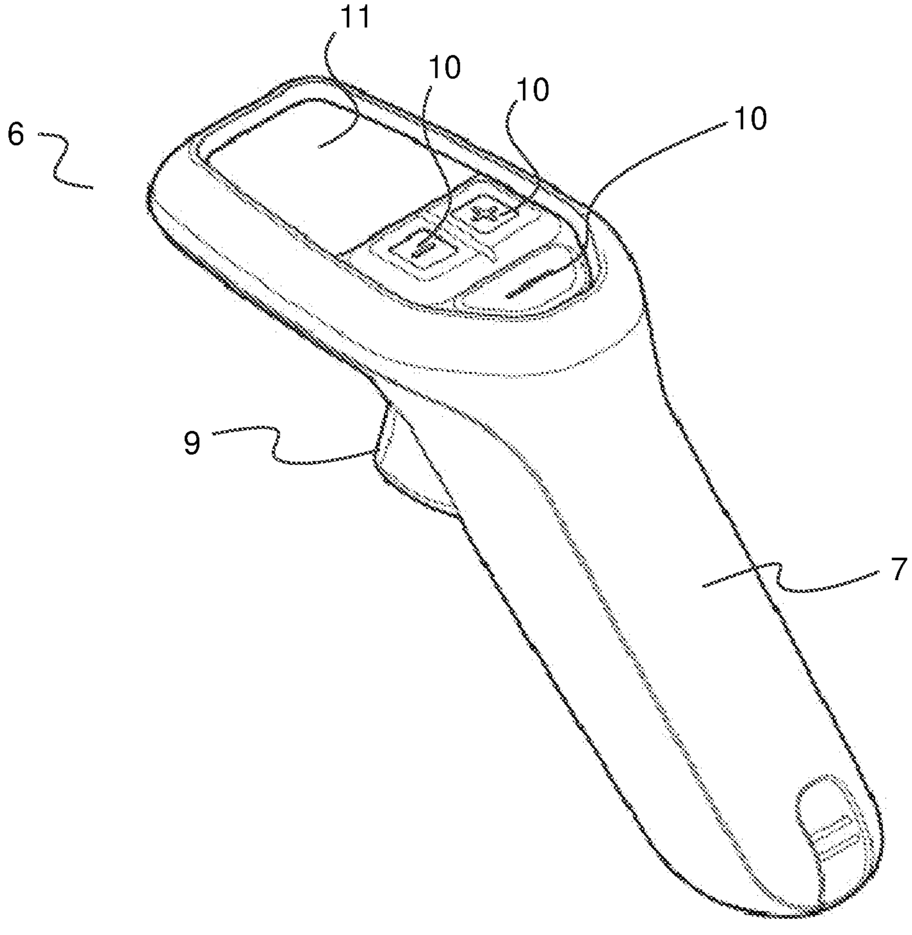
FIG. 6 is a perspective view of a hand controller for use as an input device for the watercraft of FIG. 1.

Referring now to FIG. 6, shown is an input device in the form of a hand controller 6 suitable for use with the watercraft 100. The hand controller 6 has a handle 7, allowing the hand controller 6 to be gripped by the user. The handle 7 may have a lanyard (not-shown) for placement about the wrist of the user so as to tether the hand controller 6 to the user's wrist should they lose grip of the handle 7.

The handle 7 is in the form of a pistol style grip having an actuator in the form of a trigger 9 accessible by the finger of the user having grip of the handle 7. The trigger 9 can act as an accelerator or throttle, whereby variable levels of power/speed can be indicated by partially pressing the trigger 9. The hand controller 6 also has actuators in the form of buttons 10 that can be pressed by the thumb of the user having grip of the handle 7.

The hand controller 6 has a display screen 11 at a top portion, which is proximate to the buttons 10, such that the user having grip of the handle 7 can conveniently glance at the screen 11. The screen 11 may display certain outputs, such as speed of the board, distance travelled, battery life remaining, riding time remaining and the like. These metrics may be accessible via a number of display screen layouts that can be scrolled to by the user using their thumb and a mode button 10, for example.

The hand controller 6 is small enough to allow single handed operation. That is, the trigger 9 can be operated by the user simultaneously to pressing one or more of the buttons 10 while having grip of the handle 7. In fact, the controller 6 is small enough that most riders will be able to use the palm of their hand to press on the board to stand up without the controller 6 hitting the board.

In the preferred embodiment shown, the hand controller 6 is water proof and uses a Hall Effect sensor for the throttle, thereby allowing the trigger 9 to be movable while maintaining the water proof nature of the main housing of the hand controller 6. It will be appreciated, however, that alternative forms of sensor could be used in alternative embodiments. Additionally, the controller 6 includes a moulded foam insert that ensures the controller 6 will float in water in the event that it is dropped.

The hand controller 6 preferably also includes a buzzer and/or vibrator. The buzzer and/or vibrator can be used to alert the rider to pop up warnings on the display screen 11 when riding. These warnings may indicate such states as: half board battery; low board battery; empty battery; low controller battery; high temperature; high current; and new maximum speed.

Figure 5:
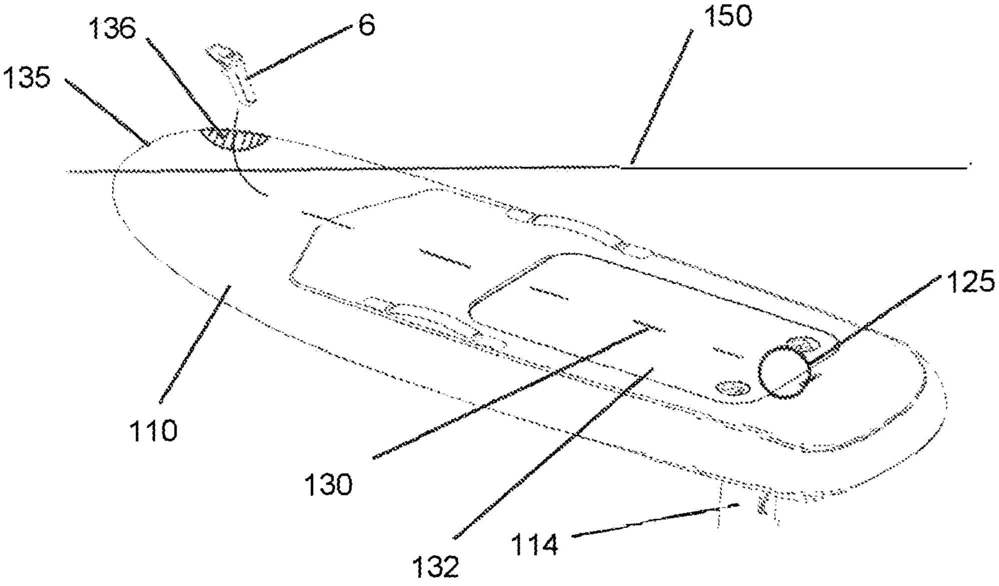
FIG. 5 is a perspective view of the hydrofoil watercraft from FIG. 1 partially submerged in water.

Referring now to FIG. 5, the watercraft 100 is shown together with the hand controller 6. The board 110 has an internal battery module 120 as described previously that cannot be seen in the Figure, but is accessed via a panel 132 that forms part of the deck 111. The battery module 120 can be removed from the board 110 once the panel 132 is first removed, which can be convenient for recharging the battery, for example. A controller module 125 is also located in the board 110, and while not actually visible the location is identified in the Figure.

The controller module 125 including the second wireless communication device 126 can exchange data wirelessly with a third wireless communication device that is located in the hand controller 6. This exchange of wireless information is illustrated schematically by the broken line 130, but in practice is achieved using a short range wireless communication protocol such as Bluetooth, Bluetooth Low Energy (BLE), or the like.

As such, the hand controller 6 and the controller 125 are linked only by a data communication being performed wirelessly. Prior to use of the watercraft 100, the hand controller 6 and the controller 125 first perform a pairing procedure, before then communicating as described herein for operation of the watercraft 100.

The board 110 has an outer shell 135 that includes a transmission section 136. This transmission section 136 is highly permeable to wireless signals as used by the wireless communication devices. That is, the transmission section 136 is highly permeable to electromagnetic radiation at least in the frequency range of 2.4 to 2.5 GHz.

The outer shell 135 is primarily constructed from carbon fibre, with the transmission section effectively being a hole in this carbon fibre shell that is covered by plastic. Accordingly, in practice the outer shell 135 is continuous in this area and the transmission section 136 would not be obvious or generally noticed at all by the user. This plastic portion is approximately 5-6 cm across, but it will be appreciated that this size could be adjusted if necessary.

The core of the board 110 is filled with a lightweight foam in areas that are not required for other components, such as the battery module 120 and the controller module 125. As the wireless signal can pass effectively through both the foam and the plastic of the transmission section 136, connectivity 130 between the controller 125 and the hand controller 6 is still possible, even with the controller 125 being mostly surrounded by the carbon fibre of the outer shell 135.

FIG. 5 also illustrates a water surface 140, with a large portion of the board 110, including the section containing the controller module 125, being located below the water surface 150. Despite this positioning of the board 110, and the fact that the wireless signal does not pass well through water, the location of the transmission section 136 near the front of the board 110 and being located above the water surface 150 means that connectivity with the hand controller 6 is maintained.

Figure 7:
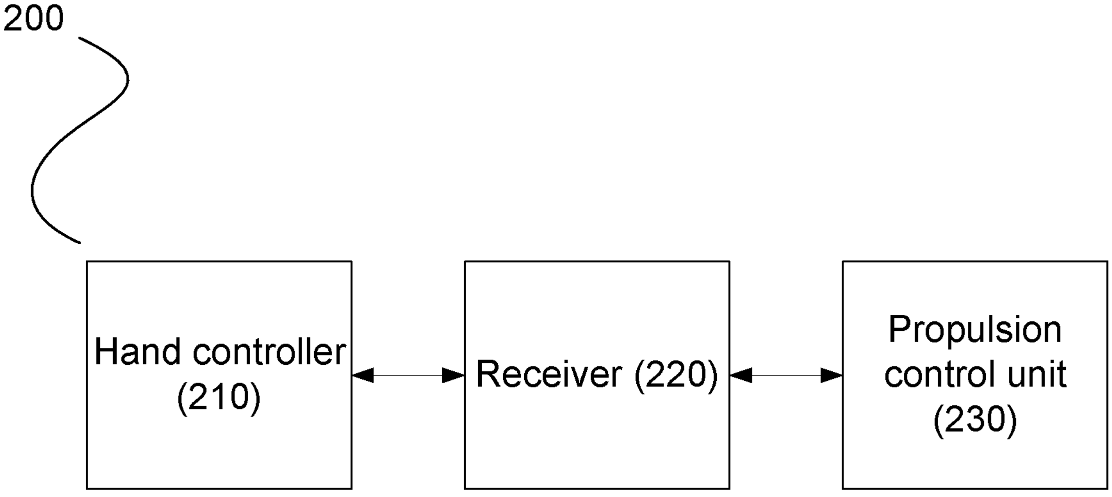
FIG. 7 illustrates a block diagram of an embodiment of a system for operating a watercraft.

Referring to FIG. 7, there is illustrated an example system 200 for operating a hydrofoil board, such as the watercraft 100. In an embodiment, the system 200 may be used to perform the method as described. As shown in the Figure, the system 200 includes a hand controller 210 that is in communication with a receiver 220, which in turn is in communication with a propulsion control unit 230. As described in earlier embodiments, the receiver 220 and the propulsion control unit 230 may both form part of the controller module 125.

The hand controller 210 may be a portable, user-operated controller that may allow a user to communicate with the propulsion control unit 230 via the receiver 220, and to remotely operate and/or control the propulsion control unit 230. In some examples, the hand controller 210 has a housing which includes a user interface for the input of commands by a user. The user interface may include one or more push-buttons, such as a "plus" button, a "minus" button, and a "mode/menu" button.

The housing may further include a display screen to display settings of the system 200 to the user. The display screen may include an organic light-emitting diode (OLED) display screen, or a passive-matrix OLED (PMOLED) display screen, or any other type of electronic display screen. In other examples, the housing may include a touch display which may provide a user interface and display information to the user. Preferably, though not necessarily, the housing of the hand controller 210 is waterproof.

The hand controller 210 may further include one or more motion sensors for sensing a motion and/or orientation of the hand controller 210. The one or more motion sensors may include an inertial measurement unit, accelerometer, a gyroscope, or any other motion sensor. In some examples, the motion sensor is a six-axis motion sensor including a three-axis gyroscope and a three-axis accelerometer.

The hand controller 210 may further include a communications unit for communicating with the receiver 220. Preferably, though not necessarily, the communications unit is a wireless communications unit, such as a Bluetooth module, configured to communicate wirelessly with the receiver 220. The hand controller 210 may further include an antenna to facilitate wireless communication between the wireless communications unit and the receiver 220.

Figure 8:
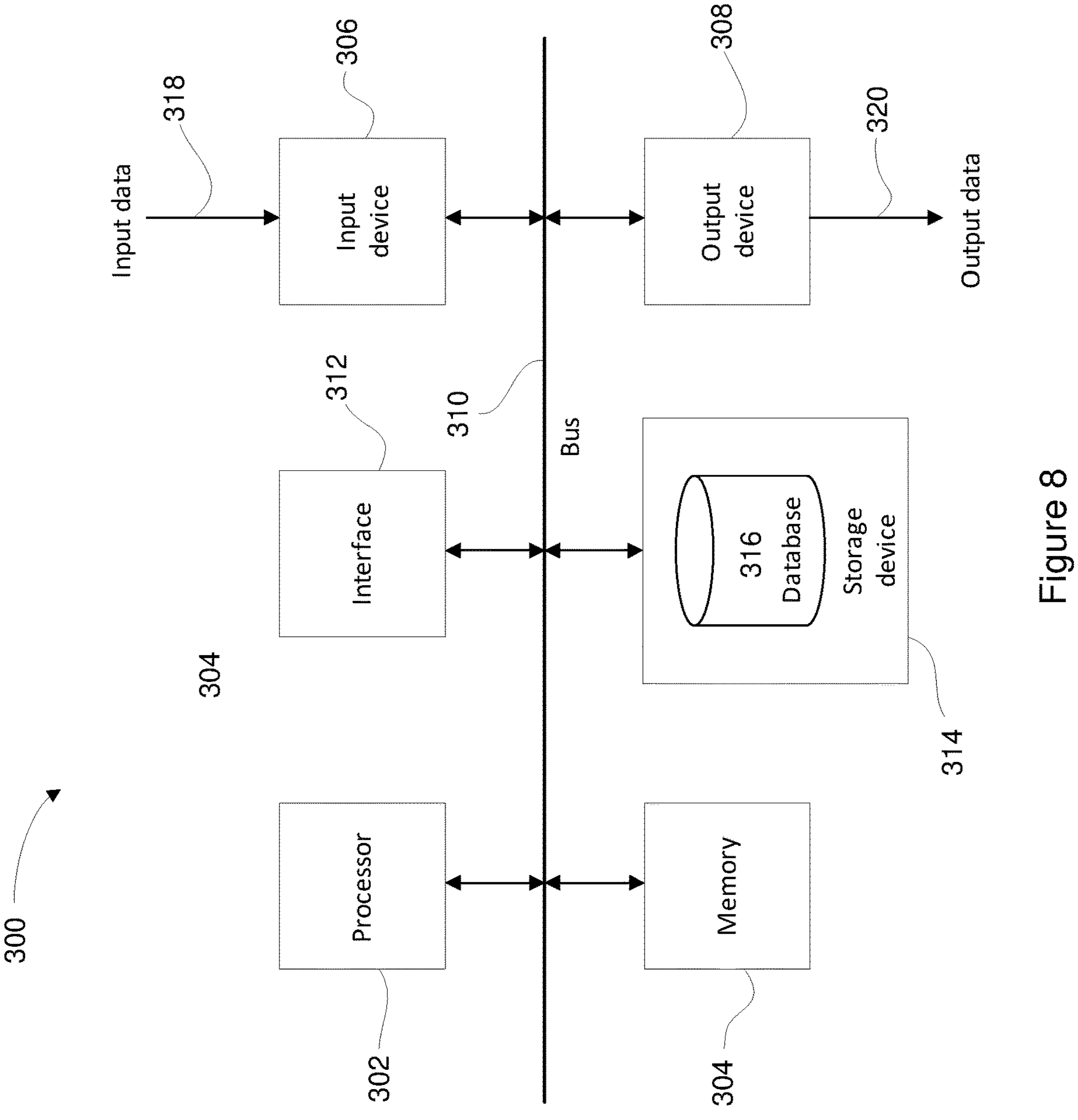
FIG. 8 illustrates an example processing system for use with a system for operating a watercraft.

The processing system may also optionally facilitate a user inputting certain parameters to affect the performance of the board, such as user weight and acceleration/power curves as hereinbefore described. In an embodiment, the processing system may take the form of an example processing system 300 as illustrated in FIG. 8 and described in more detail below.

The hand controller 210 may further include a processing system configured to receive user input commands from the user interface, to receive motion and/or orientation data from the one or more motion sensors, to operate the display screen to display settings of the system 200, and to send data and/or command signals to the propulsion control unit 230 via the receiver 220.

Preferably, though not necessarily, the hand controller 210 is battery-powered. The hand controller 210 further includes a battery, such as a lithium-polymer battery. Preferably, though not necessarily, the battery is a rechargeable battery. The hand controller 210 further includes charging circuitry for charging the battery, such as a USB port and USB charging circuitry. The battery may be used to power at least the processing system and the display screen of hand controller 210. The hand controller 210 may further include one or more power converters to adjust or condition a battery output power for powering the processing system, the display screen, and any other device of the hand controller 210.

The hand controller 210 may further include an ignition circuit to turn on or off the processing system. The ignition circuit may include a magnetic sensor, such as a Hall Effect sensor, within the housing, and one or more magnets mounted to the exterior of the housing to activate and/or deactivate the hand controller 210.

In some examples, the receiver 220 may be configured to be embedded within a module, together with the propulsion control unit 230. The receiver 220 may include a housing. Preferably, though not necessarily, the housing is waterproof.

The receiver 220 may include a communications unit for communicating with the hand controller 210. Preferably, though not necessarily, the communications unit may be a wireless communications unit, such as a Bluetooth module, configured to communicate wirelessly with the hand controller 210.

The receiver 220 may further include an ignition circuit to turn on or off the processing system. The ignition circuit may include a magnetic sensor, such as a Hall Effect sensor, within the housing.

The receiver 220 may further include a processing system configured to receive user input commands from the user interface. The processing system may take the form of the example processing system 100.

The receiver 220 may further include a connector to enable a wired connection to the propulsion control unit 230. In some examples, the processing system may be further configured to send data to the propulsion control unit 230 through the connector. In some examples, the propulsion control unit 230 is configured to supply a power signal to the receiver 220 through the connector.

The receiver 220 may be located in the core of the board. The nose portion of the board may be more likely to remain above the water surface when a user positions themselves on the board, so it is desirable that transmission can still occur with the receiver 220 even if it is under water. This may be achieved by the wireless signal passing through the board, even if the receiver 220 is located below the water surface.

This arrangement may provide for transmission between the receiver 220 and the hand controller 210 to still occur, without the need to connect the receiver 220 to the propulsion control unit 230 over a great distance.

Even in a stationary position, a user lying on the board in a prone position generally orientates themselves toward the back of the board, which may cause the front of the board to raise above the water surface, such that placement of a transmission section in the nose of the board may provide a more reliable control link when first providing power to the propulsion source.

While other systems may check signal strength and turn off the controller connection if the signal is not strong enough, this is typically not required in the present system because a digital signal is used with error checking built in.

The propulsion control unit 230 may be configured to be housed within the hydrofoil board and to be coupled to a propulsion source. For example, the propulsion control unit may be drivingly coupled to a propeller of the hydrofoil board. Preferably, though not necessarily, the propulsion control unit 230 is mounted within a core of the board.

The propulsion control unit 230 may include a motor controller operatively connected to a motor for driving the propeller. The motor may be a three-phase brushless DC motor.

The propulsion control unit 230 may further include a processing system configured to receive a first user input from the hand controller 210, selecting one of a plurality of operating pre-sets of operation of the propulsion control unit 230. The processing system may be further configured to operate the motor through the motor controller according to the selected operating pre-set.

The operating pre-sets may be selected by the user via the user interface of the hand controller 210. The operating pre-sets may correspond to different styles of operation of the board.

The propulsion control unit 230 may further include a battery module, including a battery and a battery management system, for powering the processing system, the motor controller, and any other device of the propulsion control unit 230. The propulsion control unit 230 may further include one or more power converters to adjust or condition a power signal from the battery module.

The propulsion control unit 230 is connected to the receiver 220 through a wire, or cable, connected to the connector of the receiver 220. The battery module of the propulsion control unit 230 may further be configured to supply power to the receiver 220 through the wire or cable.

In an embodiment, the propulsion control unit 230 and/or the receiver 220 may communicate with the hand controller 210, for instance, to display information drawn from the system 200 on the screen of the hand controller. By way of example, the battery management system of the propulsion control unit 230 may communicate to provide such output on the screen of the hand controller 210 as battery life remaining and dynamic range information.

A particular embodiment of the present invention can be realised using one or more processing systems, an example of which is shown in FIG. 8. In particular, the processing system 300 generally includes at least one processor 302 or processing unit or plurality of processors, memory 304, at least one input device 306 and at least one output device 308, all coupled together via a bus or group of buses 310. In certain embodiments, the input device 306 and the output device 308 could be the same device.

An interface 312 can also be provided for coupling the processing system 300 to one or more peripheral devices. At least one storage device 314 which houses at least one database 316 can also be provided. The memory 304 can be any form of memory device, for example, volatile or non-volatile memory, solid state storage devices, magnetic devices, etc. The processor 302 could include more than one distinct processing device, for example to handle different functions within the processing system 300.

The input device 306 receives input data 318. The input data 318 could come from different sources, for example a hand controller or a mobile phone application in conjunction with data received via a network. The output device 308 produces or generates output data 320 and can include, for example, a display device or a data transmitter. The storage device 314 can be any form of data or information storage means, for example, volatile or non-volatile memory, solid state storage devices, magnetic devices, etc.

In use, the processing system 300 is adapted to allow data or information to be stored in and/or retrieved from, via wired or wireless communication means, the at least one database 316. The interface 312 may allow wired and/or wireless communication between the processing unit 302 and peripheral components that may serve a specialised purpose.

The processor 302 receives instructions as input data 318 via the input device 306 and can display processed results or other output to a user by utilising the output device 308. More than one input device 306 and/or output device 308 can be provided.

In the foregoing description of preferred embodiments, specific terminology has been resorted to for the sake of clarity. However, the invention is not intended to be limited to the specific terms so selected, and it is to be understood that each specific term includes all technical equivalents which operate in a similar manner to accomplish a similar technical purpose. Terms such as “front” and “rear”, “inner” and “outer”, “above” and “below” and the like are used as words of convenience to provide reference points and are not to be construed as limiting terms Throughout this specification and claims which follow, unless the context requires otherwise, the word “comprise”, and variations such as “comprises” or “comprising”, will be understood to imply the inclusion of a stated integer or group of integers or steps but not the exclusion of any other integer or group of integers. As used herein and unless otherwise stated, the term "approximately" means ±20%.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A hydrofoil watercraft, comprising:
 - a board;
 - a mast;
 - a hydrofoil connected to the board by the mast;
 - a motor connected to the board by the mast;
 - a battery system disposed in the board, the battery system comprising
   - a battery housing,
   - a battery disposed in the battery housing, and
   - a first wireless communication device disposed in the battery housing, the first wireless communication device being configured to transmit battery status data; and
 - a control system disposed in the board, the control system comprising
   - a controller housing,
   - a controller disposed in the controller housing, and
   - a second wireless communication device disposed in the controller housing, the second wireless communication device being configured to receive the battery status data and relay the battery status data to the controller,
 - wherein the battery system and the control system are linked by an electrical connection for transmission of power only with all data communication between the battery system and the control System being performed wirelessly, including transmission of the battery status data from the first wireless communication device of the battery system disposed in the board and receipt of the battery status data at the second wireless communication device of the control system disposed in the board.

2. The hydrofoil watercraft according to claim 1, wherein the second wireless communication device is configured to transmit the battery status data to the first wireless communication device.

3. The hydrofoil watercraft according to claim 1, further comprising device comprising a third wireless communication device that is configured to exchange data with one or more of the first wireless communication device and the second wireless communication device,
 - wherein the board further comprises an outer shell that has a first transmission part permeable to wireless signals used by the third wireless communication device.

4. The hydrofoil watercraft according to claim 3, wherein the input device is a hand controller.

5. The hydrofoil watercraft according to claim 3, wherein the third wireless communication device exchanges the data with the second wireless communication device.

6. The hydrofoil watercraft according to claim 3, wherein the outer shell of the board comprises carbon fibers in locations other than the transmission part.

7. The hydrofoil watercraft according to claim 3, wherein the first transmission part is at least one of:
 - located proximal to a front end of the board,
 - located proximal to a rear end of the board, and
 - located on a portion of a deck of the board.

8. The hydrofoil watercraft according to claim 3, wherein the outer shell of the board further comprises a second transmission part, wherein the two transmission parts are located at substantially opposite locations of the board.

9. The hydrofoil watercraft according to claim 3, wherein the first transmission part is permeable to electromagnetic radiation in the frequency range of one or more of 2.4 to 2.5 GHZ and 5 to 6 GHZ.

10. The hydrofoil watercraft according to claim 1, wherein a dimension of the first transmission part is chosen from the group comprising:
 - 5-6 cm,
 - 4-7 cm,
 - 6-10 cm, and
 - <5 cm.

11. The hydrofoil watercraft according to claim 1, wherein data is transferred using a short-range wireless protocol.

12. The hydrofoil watercraft according to claim 1, wherein the first and second wireless communication devices are paired as required prior to exchanging data.

13. The hydrofoil watercraft according to claim 1, wherein the controller system and the battery system are removable from the board.

14. The hydrofoil watercraft according to claim 1, wherein the controller system is in a waterproof compartment.

15. The hydrofoil watercraft according to claim 1, wherein an air gap is defined between the battery system and the controller system.

16. The hydrofoil watercraft according to claim 1, wherein the controller housing and the battery housing are each constructed at least partially from one of plastic and fiberglass.

17. The hydrofoil watercraft according to claim 1, wherein the board comprises a socket, and
 - wherein the controller system is fixed to an upper end of the mast, the controller system configured to be coupled to the board by inserting at least a portion of the controller system into the socket of the board.

18. The hydrofoil watercraft according to claim 1, wherein there is no electrical connection between the battery system and the board or between the controller system and the board.

19. The hydrofoil watercraft according to claim 1, wherein a core of the board comprises at least one of:
 - foam, and
 - a hollow section.

* * * * *